(12) United States Patent
Peters

(10) Patent No.: US 9,669,244 B2
(45) Date of Patent: Jun. 6, 2017

(54) PORTABLE PERSONAL DESCENDING ESCAPE SYSTEM

(71) Applicant: Richard A. Peters, Medina, WA (US)

(72) Inventor: Richard A. Peters, Medina, WA (US)

( * ) Notice: Subject to any disclaimer, the term of this patent is extended or adjusted under 35 U.S.C. 154(b) by 8 days.

(21) Appl. No.: 14/792,533

(22) Filed: Jul. 6, 2015

(65) Prior Publication Data

US 2016/0008637 A1    Jan. 14, 2016

Related U.S. Application Data

(63) Continuation-in-part of application No. 12/855,586, filed on Aug. 12, 2010, now Pat. No. 9,072,920.

(60) Provisional application No. 61/233,155, filed on Aug. 12, 2009.

(51) Int. Cl.
  *A62B 1/02*  (2006.01)
  *A01K 1/02*  (2006.01)
  *B63C 9/26*  (2006.01)

(52) U.S. Cl.
  CPC .............. *A62B 1/02* (2013.01); *A01K 1/0254* (2013.01); *B63C 9/26* (2013.01)

(58) Field of Classification Search
  CPC .... A62B 1/00; A62B 1/02; A62B 1/16; B63C 9/26; B66C 1/18; A01K 1/0254
  See application file for complete search history.

(56) References Cited

U.S. PATENT DOCUMENTS

| | | | | |
|---|---|---|---|---|
| 50,596 | A * | 10/1865 | Jones | E06C 9/14 182/101 |
| 2,602,482 | A * | 7/1952 | Lyon | E06C 5/006 383/102 |
| 4,730,696 | A | 3/1988 | Johnson | |
| 5,337,891 | A * | 8/1994 | Toth | H04N 5/2252 206/316.2 |
| 5,586,655 | A * | 12/1996 | McBride | A45C 7/0077 174/135 |
| 5,743,447 | A * | 4/1998 | McDermott | A45C 7/0068 224/153 |
| 6,021,740 | A * | 2/2000 | Martz | A01K 1/0254 119/482 |
| 6,076,485 | A * | 6/2000 | Peeples | A01K 1/0254 119/496 |

(Continued)

FOREIGN PATENT DOCUMENTS

| | | | | |
|---|---|---|---|---|
| FR | 1222301 | * | 6/1960 | ............... B63C 9/26 |
| GB | 191222984 | A * | 0/1913 | ............... A62B 1/02 |
| GB | 2174901 | | 11/1986 | |

*Primary Examiner* — Colleen M Chavchavadze
(74) *Attorney, Agent, or Firm* — Dean A. Craine

(57) ABSTRACT

A portable personal descending escape system that includes a flexible, folding body sack designed to hold a small child or animal that can be gradually lowered to the ground by a single individual. The body sack is designed to fold into a small storage bag. The body sack includes a closable top opening and at least one side panel partially made of mesh material. A slide connector is disposed around the joining edges of the top opening that allows the top opening to be selectively opened or closed. Attached to the opposite sidewalls on the body sack near the top opening are two handles. Attached to the body sack is an elongated strap with a plurality of strap handles attached thereto. The strap handles are evenly spaced apart so that one individual may gradually release the handle to safely lower the child or animal to the ground.

7 Claims, 10 Drawing Sheets

(56) References Cited

U.S. PATENT DOCUMENTS

| | | | |
|---|---|---|---|
| 6,394,036 B2 * | 5/2002 | Burns | A01K 1/0254 |
| | | | 119/497 |
| 6,478,157 B1 | 11/2002 | Witt et al. | |
| 6,830,170 B2 | 12/2004 | Abel | |
| 6,880,671 B2 * | 4/2005 | Raby | A62B 1/02 |
| | | | 182/18 |
| 7,458,334 B2 | 12/2008 | Baker | |
| 7,585,197 B1 * | 9/2009 | Merten | B63C 9/26 |
| | | | 182/136 |
| 7,617,797 B2 * | 11/2009 | Lam | A01K 1/0245 |
| | | | 119/28.5 |
| 2003/0127060 A1 * | 7/2003 | Yeung | A01K 1/0254 |
| | | | 119/497 |
| 2005/0284717 A1 * | 12/2005 | Chernoff | A45C 3/004 |
| | | | 190/18 A |
| 2010/0018426 A1 | 1/2010 | Kirkham | |
| 2011/0018293 A1 | 1/2011 | Escobar | |
| 2016/0009346 A1 * | 1/2016 | Leatherman | B63C 9/26 |
| | | | 150/106 |

\* cited by examiner

PORTABLE PERSONAL DESCENDING ESCAPE SYSTEM

COPYRIGHT NOTICE

Notice is hereby given that the following patent document contains original material which is subject to copyright protection. The copyright owner has no objection to the facsimile or digital download reproduction of all or part of the patent document, but otherwise reserves all copyrights whatsoever.

This is a continuation in part application based on the utility patent application (application Ser. No. 12/855,586) filed on Aug. 12, 2010 which claims benefit of U.S. Provisional Application No. 61/233,155 filed on Aug. 12, 2009.

BACKGROUND OF THE INVENTION

1. Field of the Invention

This invention pertains to fire escape systems, and more particularly to fire escape systems that enable an individual or animal to be partially restrained and safely lowered from an elevated position to a ground.

2. Description of the Related Art

The sleeping and living quarters of two or three story residential homes are characteristically on the second and third floors. If a fire breaks out in the home, it can be difficult and sometimes deadly when trying to escape. If the heights are not too large, adults and teenagers can jump to the ground or climb down on other objects. If the heights are too large or if the individual is unable to extricate themselves, they must wait for assistance from others.

It is well known, that guests assigned to rooms in the upper floors of the hotel are at higher risks of injury or death should a fire break out in the hotel. In some instances, fireman may be unable to rescue guests from the rooms located in the upper floors. The only option these guest have is take action to escape through a widow or patio door.

When traveling with young children or animals and a fire breaks out on an upper floor which traps the guests in their room, most adults first look for ways to safely extricate the children and the animals from the room. Once the children and animals have been extricated, then the adult will looks for ways to extricate themselves.

SUMMARY OF THE INVENTION

It is an object of the present invention to provide a portable descending fire escape system.

It is another object to provide such a system that can be easily stored in a compact configuration and then easily deployed when the need to escape arises.

It is another object to provide a system that enables a small child or animal to be safely lowered from an elevated by a single adult.

These and other objects are met by a portable personal descending escape system that includes a flexible, folding body sack that is an integrally attached or selectively removable from a small, storage bag. During use, the body sack is folded inside the small storage bag which is designed to be transported by the user in his or her luggage or stored in a dresser or under the bed. When a fire occurs and the descending escape system is needed, the body sack is easily pulled from the storage bag and extended into a bag configuration. The body sack includes a top opening with a draw cord and cinching connector that enables the top opening to be selectively closed. The top opening is sufficiently wide and the body sack is sufficient long and made of store durable material to hold up to a 70 lb child or animal. The body sack includes two side panels partially made from mesh material with small mesh openings that enables air and light to travel through the body sack during use. Mounted on the side of the body sack is a handle that enables the bag to be vertically held upright when a child or animal is placed inside and transported to a window or doorway. Attached to the body sack near the top opening is a loop which is attached to a rope supplied in the storage bag. In a second embodiment, the loop and rope are replaced by an elongated nylon strap that is permanently attached at one end directly to the bag's top edge. The elongated strap includes a plurality of strap handles that are longitudinally aligned and evenly spaced apart on the elongated strap that enables a single individually to gradually release the strap and lower the body sack to a lower safe location.

In another embodiment, two handles are attached to the opposite sides of the body sack. The draw string is replaced by a slide connector that extends around the entire adjoining top edges of the body bag that enables the body bag to be selectively opened or closed. Also, the lower section of the elongated strap extends longitudinally downward over the outside surface of the body bag and affixes to the body bag.

Also, printed on the side of the bag sack or on the draw cord or on the elongated strap is reflective material that increases visibility of the bag sack. The bag sack, the draw cord and elongated strap may also be made of fibers that are reflective.

DESCRIPTION OF THE PREFERRED EMBODIMENT(S)

Figure 5:
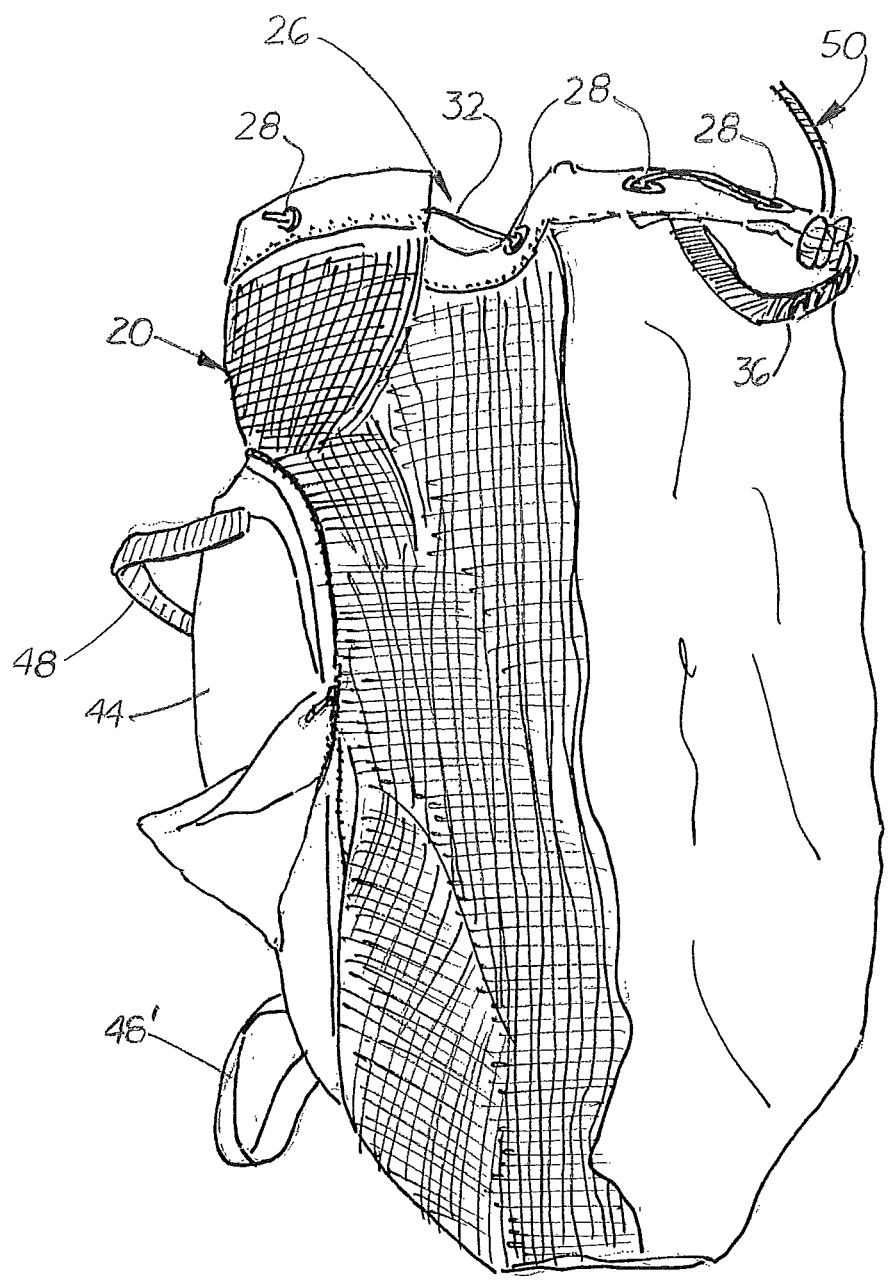
FIG. 5 is a side elevational view of the body sack showing the position of the integrally attached storage bag after being converted.
Figure 6:
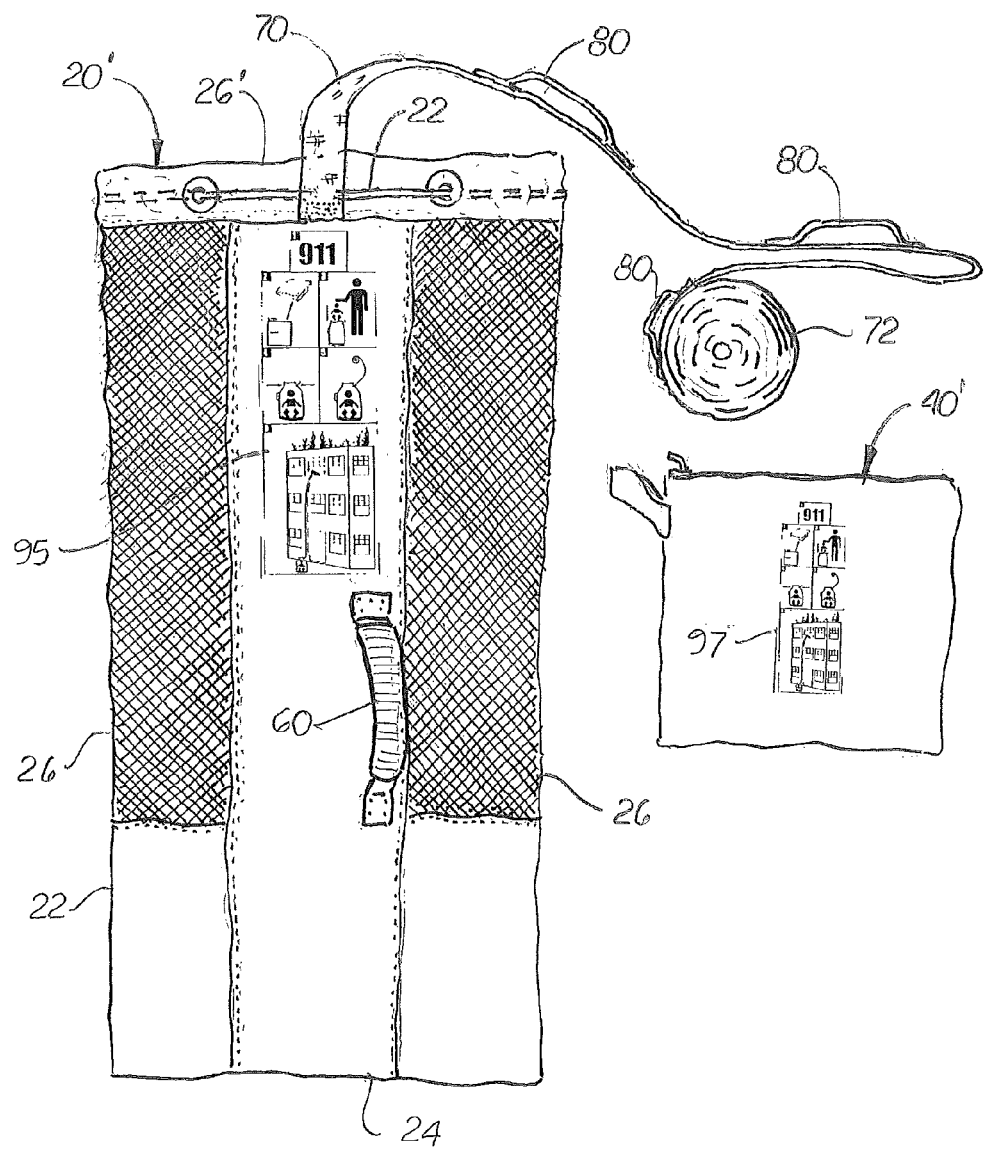
FIG. 6 is a front elevational view of a second embodiment of the bag sack and a detached storage bag.
Figure 7:
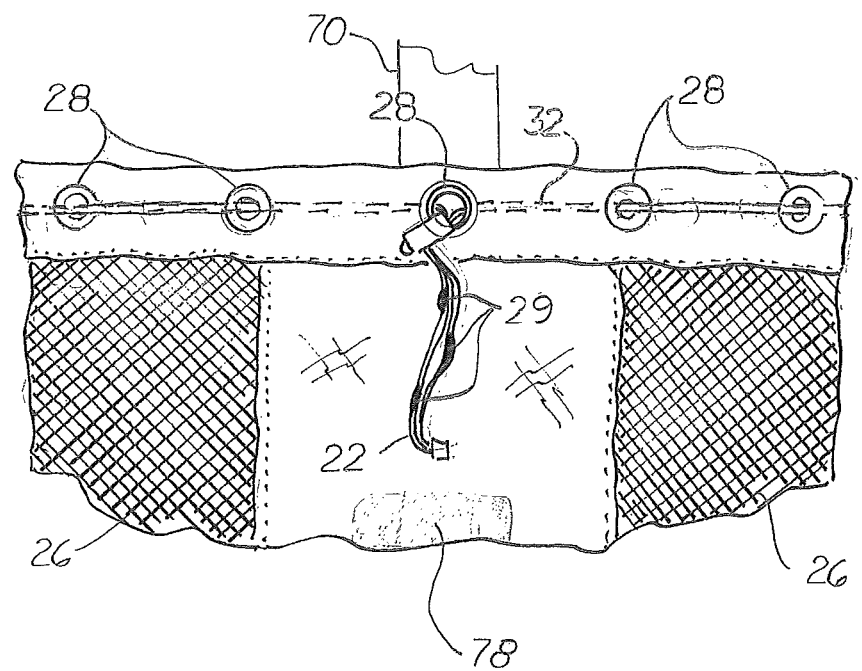
FIG. 7 is a partial rear elevational view of the bag sack shown in FIG. 6.
Figures 8, 9:
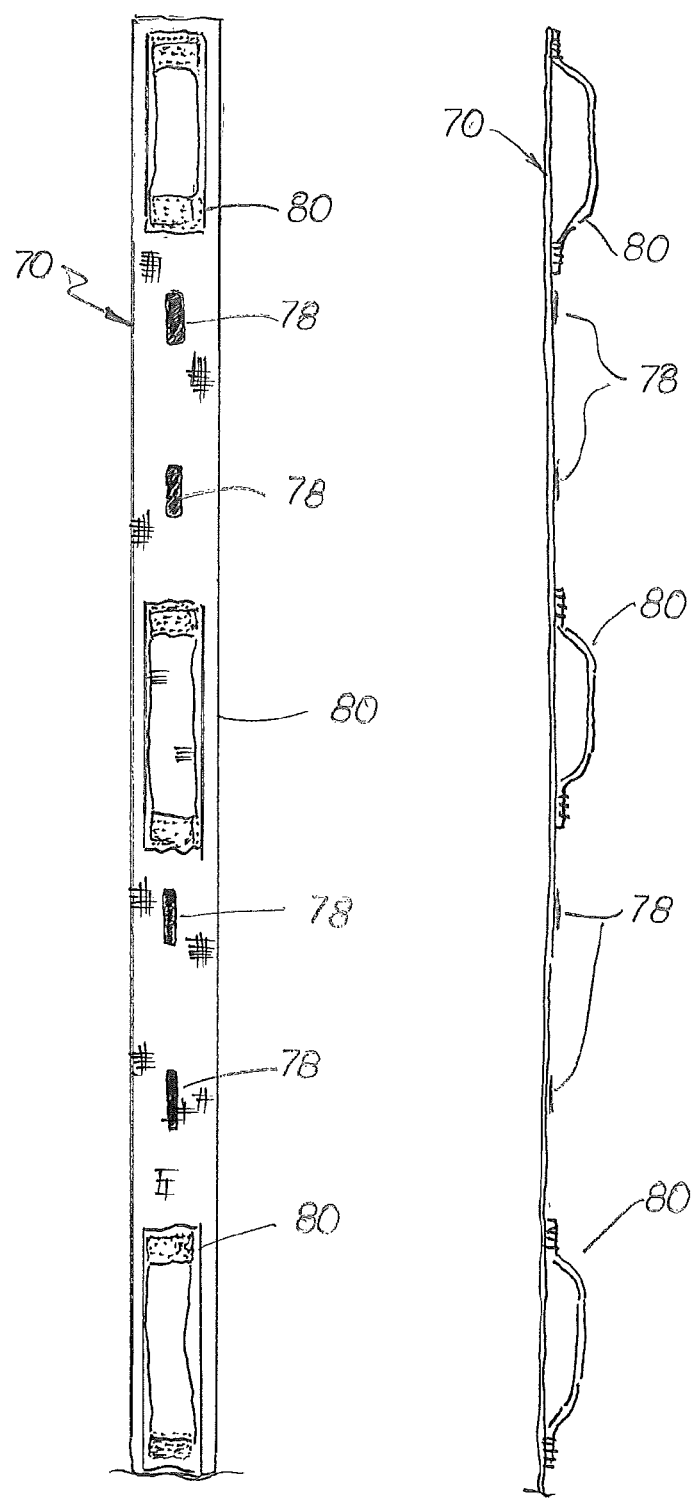
FIG. 8 is a top plan view of a section of the elongated strap with strap handles and reflective material printed thereon.
FIG. 9 is a side elevational view of the elongated strap shown in FIG. 8.

Referring to the FIGS. 1-5, there is shown a first embodiment of a portable personal descending escape system 10 that includes a flexible, folding body sack 20 that that includes an integrally attached compact small storage bag 40. The body sack 20 is a cylindrical-shaped bag with closed sidewall 22, a closed bottom panel 24 and a top opening 26. Formed the top opening 26 is a plurality of evenly spaced apart grommets 28 through which a draw cord 32 is extended. A cinching connector 34 shown more clearly in FIG. 5 is connected to the draw cord 32 that enables the user to selectively adjust the length of the draw cord 32 to manually open or close the top opening 26 by pulling the draw cord 32 through the cinching connector 34. Mounted on the side of the body sack 20 near the top opening 26 is a loop 36. In the first embodiment shown in FIG. 3, a long rope 50 that is included in the storage bag 40 is tied to the handle 36.

Attached to the sidewall 22 of the body sack 20 is a handle 60 that enables the user to move the body sack 20 after a child or animal has been place inside.

FIGS. 6-9 show a second embodiment of the system 10 which use separate bag sack 20' and storage bag 40'. The bag sack 20' is nearly identical to the bag sack 20 shown in FIGS. 1-5 but includes a nylon elongated strap 70 permanently attached at one end to the bag sack 20' adjacent to the top opening 26'. The elongated strap 70 includes a plurality of strap handles 80 longitudinally aligned and evenly spaced apart on the elongated strap 80. In the preferred embodiment, the strap handles 80 are made of nylon strap material and measure 5 to 7 inches in length. The strap handles are 9 to 12 inches apart along the elongated strap 70. During use, the elongated strap 70 is wound into a compact roll 72. The elongated strap 70 is then unwound from the roll 72 and gradually released so that the body sack 22' to a lower safe location using the strap handles 80.

Figure 10:
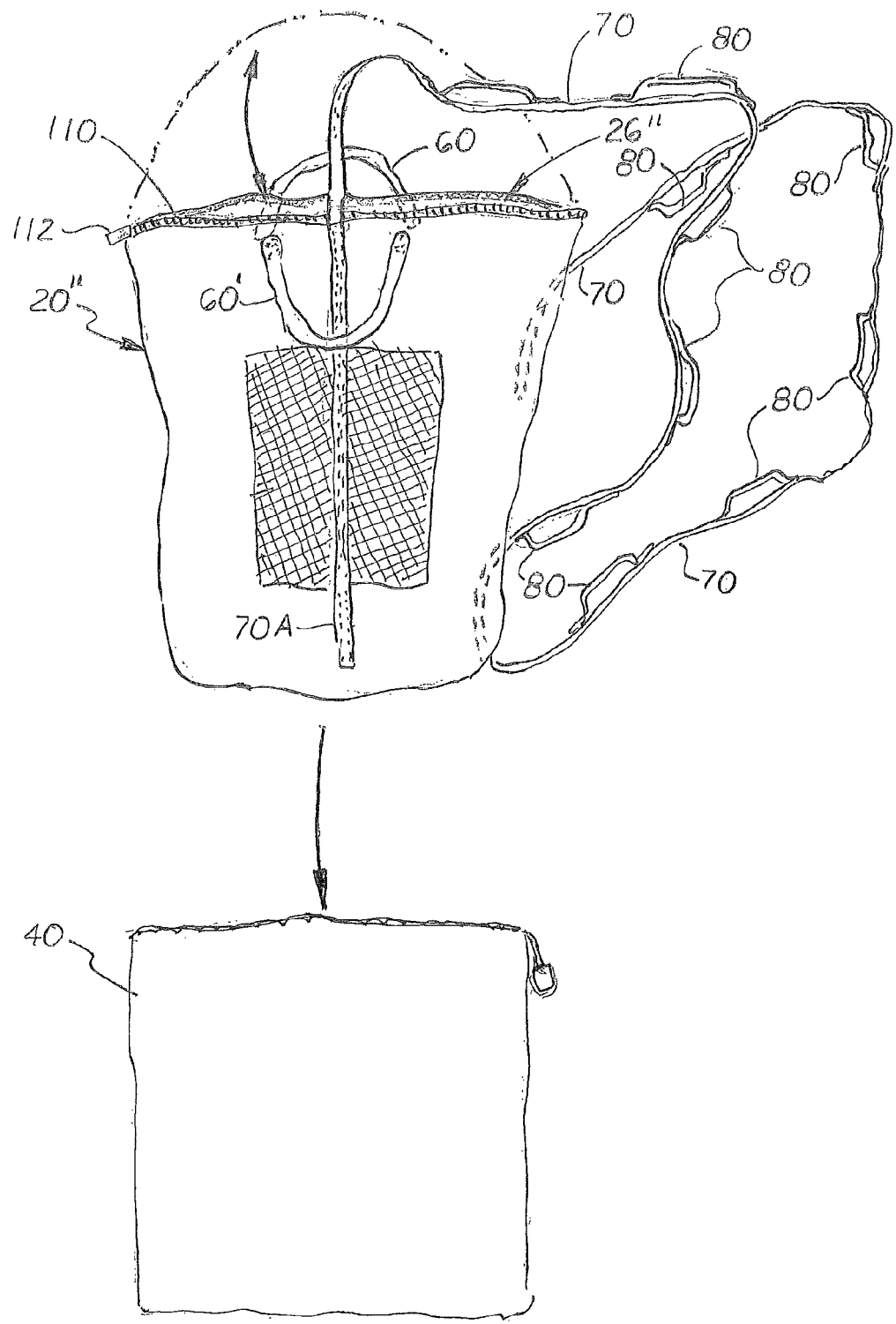
FIG. 10 is a side elevational view of the body sack with two handles are attached to the opposite sides of the body sack and uses a slide connector in place of a draw string that extends around the entire adjoining top edges of the body bag that enables the body bag to be selectively opened or closed, also the lower section of the elongated strap extends longitudinally downward over the outside surface of the body bag and affixes to the body bag.
Figure 11:
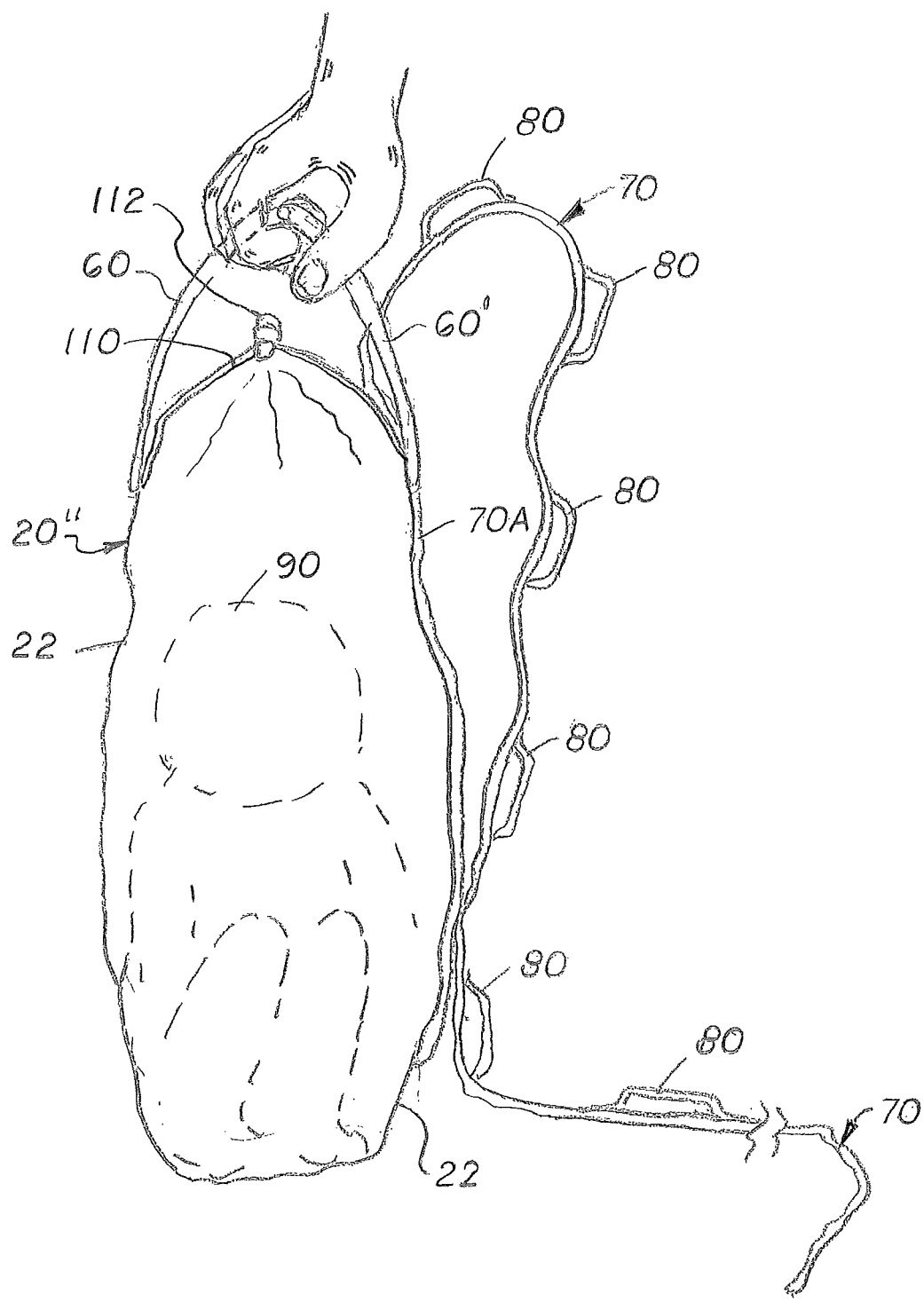
FIG. 11 is an illustration showing a parent carrying an infant placed into the body bag and carried by the two handles.

In another embodiment shown in FIGS. 10 and 11, two handles 60, 60' are attached to the opposite sidewalls 22" of the body sack 20. The draw string is replaced by a slide tape 110 and slide connector 112 that extends around the entire adjoining top edges of the top opening 26" formed on the body bag 20" that enables the top opening 26" to be selectively opened or closed. Also, the lower section 70A of the elongated strap 70 extends longitudinally downward over the outside surface of the body bag 20" and affixed to one sidewall 22".

In each embodiment of the system 10, indicia panels 95, 97 with visual instructions may be attached or printed on the front panel of the body sack 20' and storage bag 40'.

Figure 1:
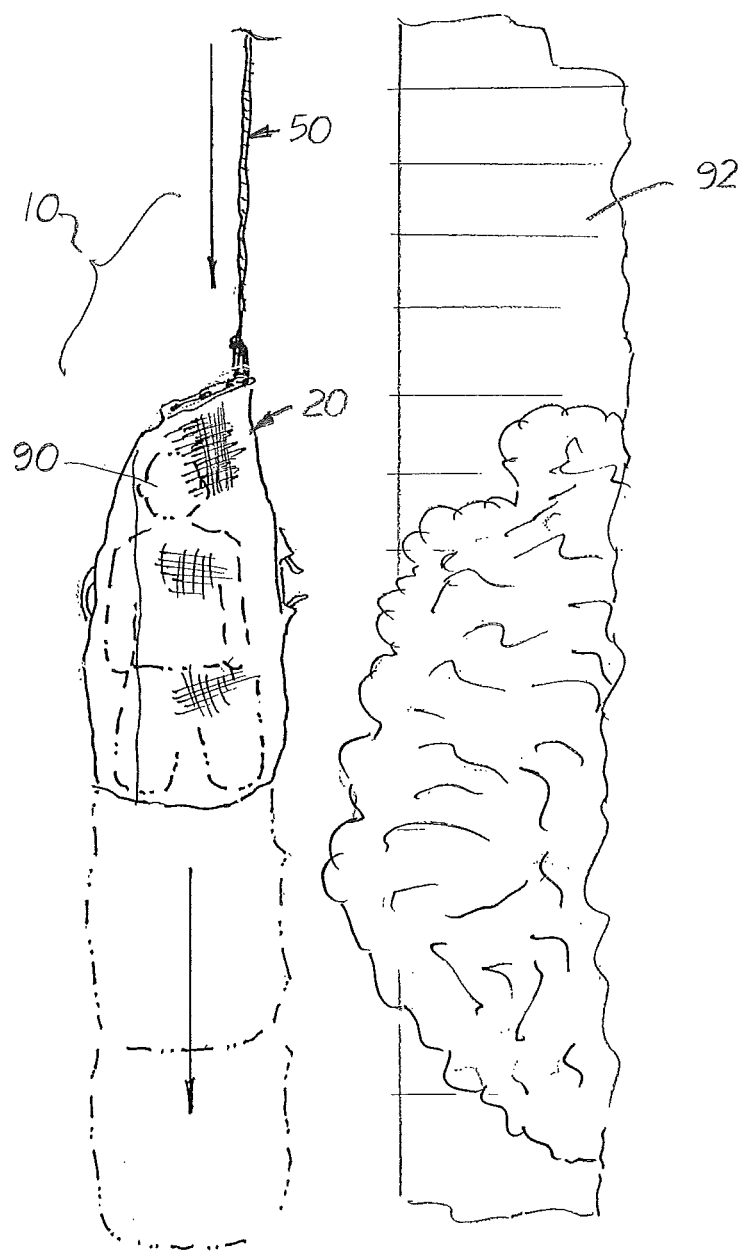
FIG. 1 is a side elevational view of a building showing the system being used to lower a small child from an elevated location on the building.
Figure 2:
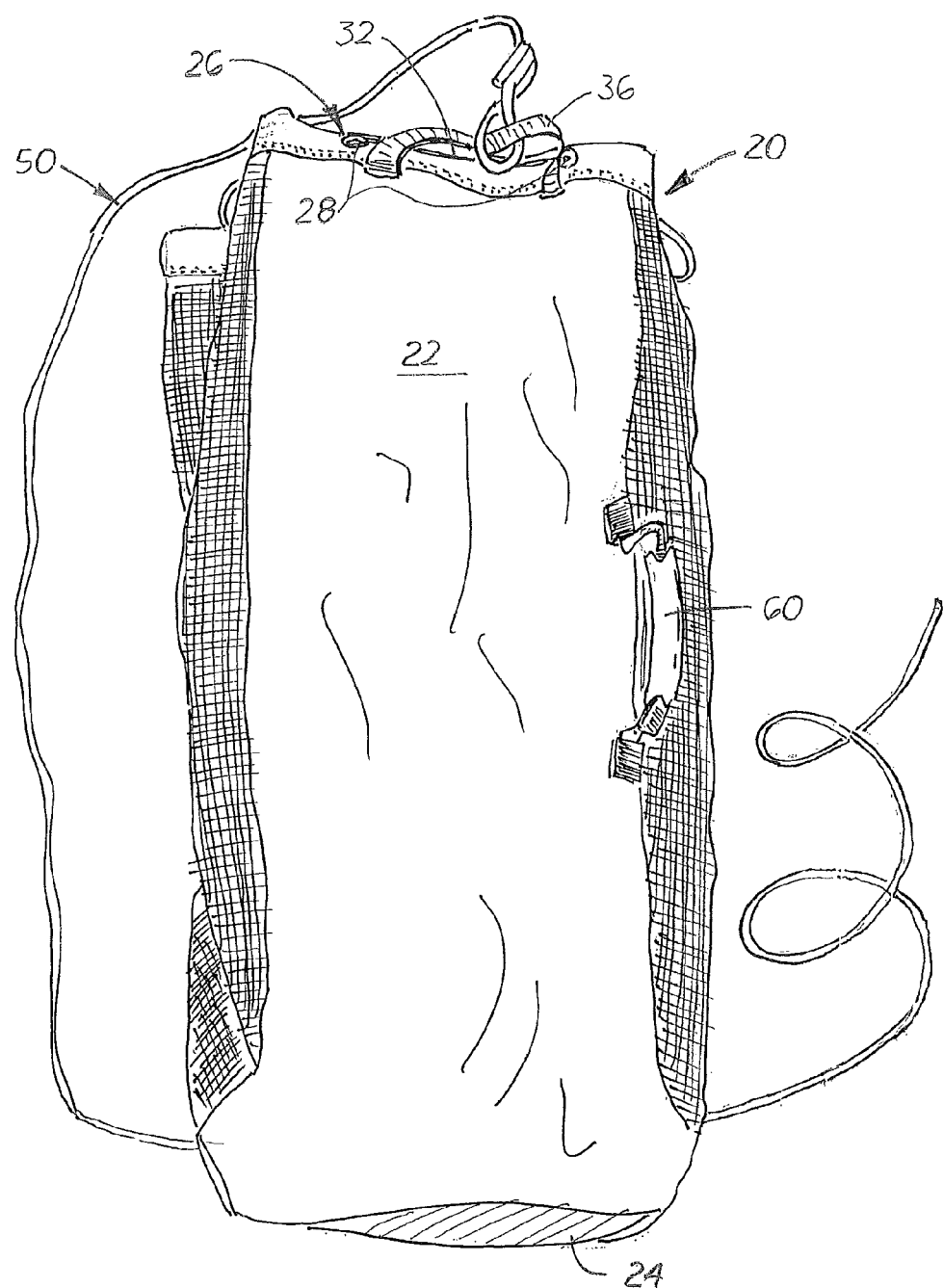
FIG. 2 is a side elevational view of the unfolded body sack.
Figure 3:
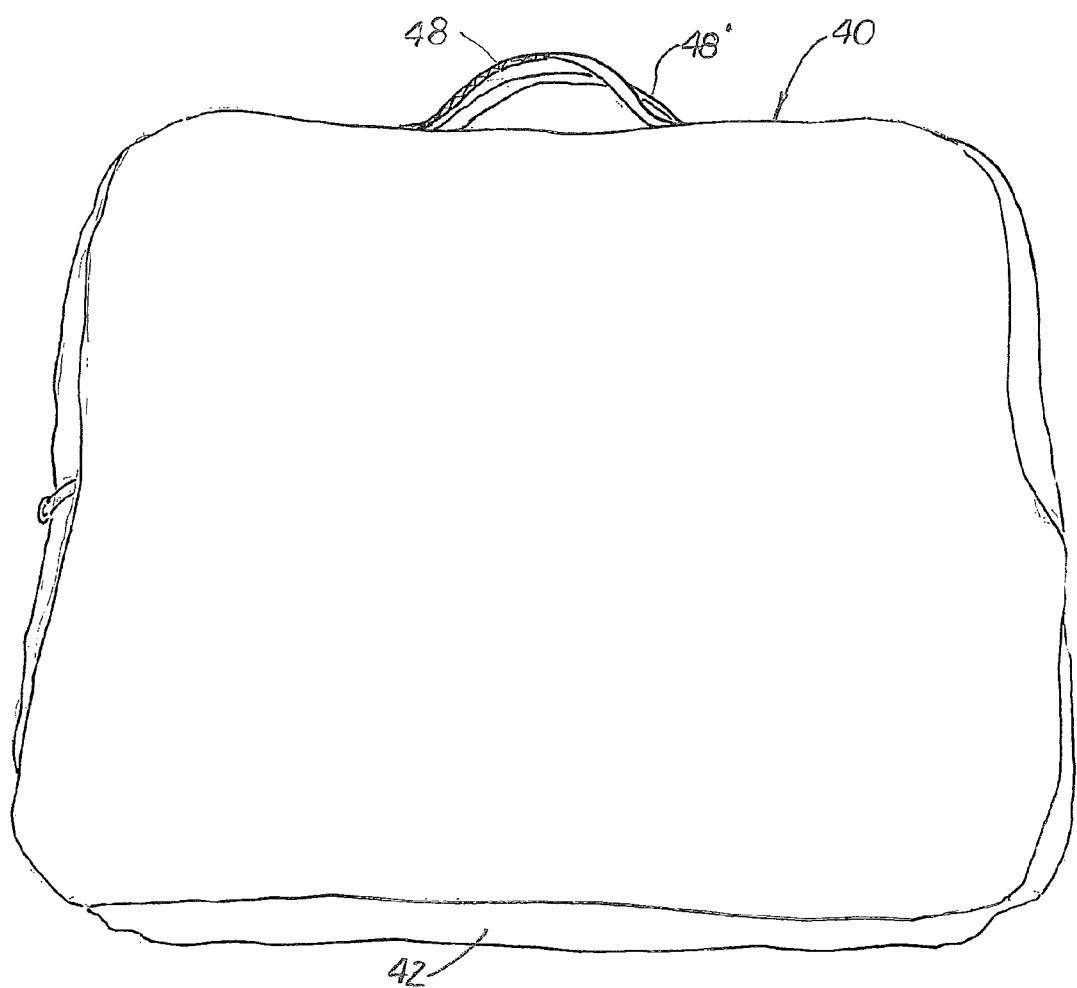
FIG. 3 is a side elevational view of the storage bag.
Figure 4:
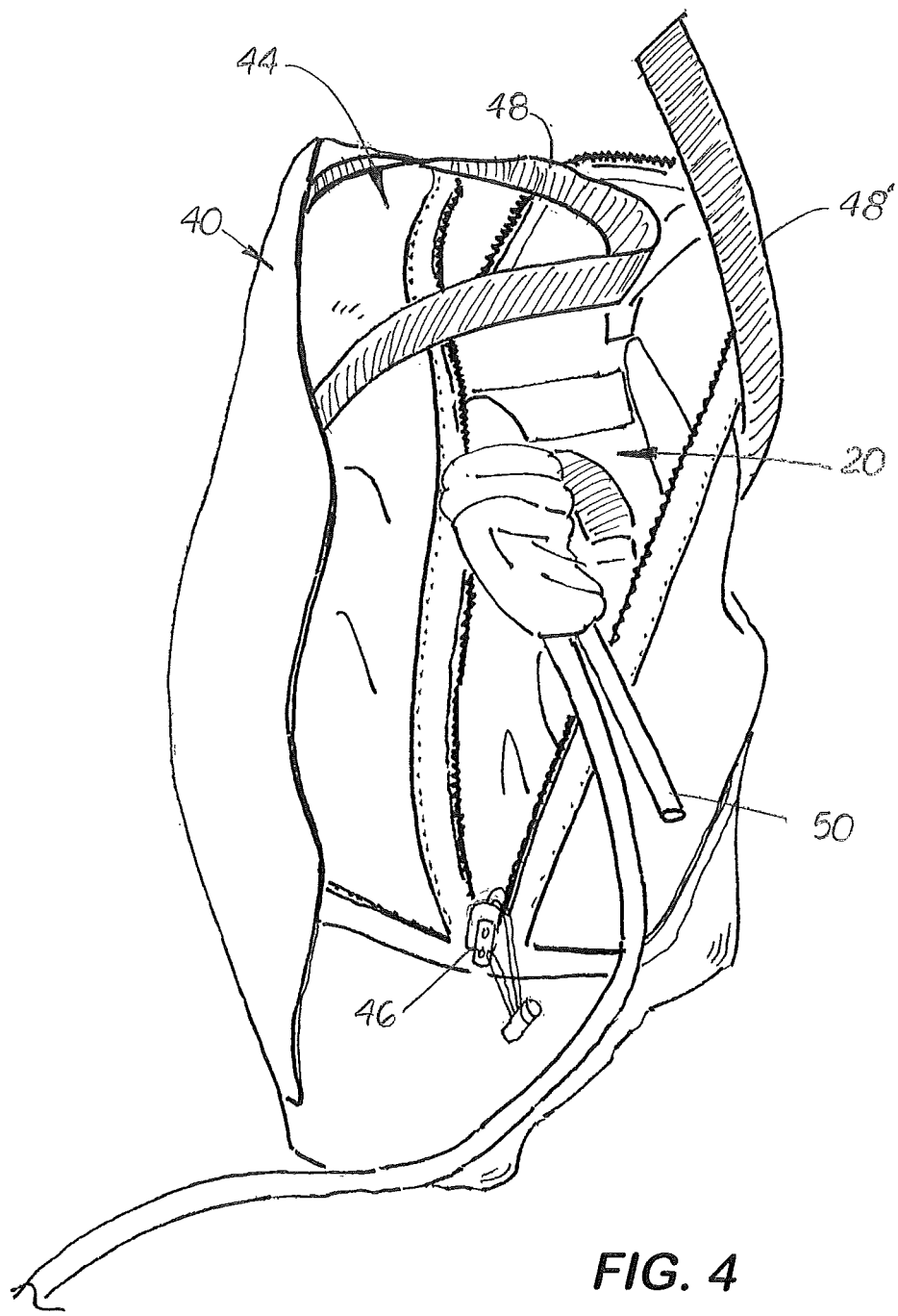
FIG. 4 is an end perspective view of the storage bag show in FIG. 3 partially open with the body bag and ropes stored therein.

The size of the body sack 20, 20' is sufficient for holding a small child as shown in FIG. 1 or an animal (not shown). In preferred embodiment, the body sack 20, 20', and 20" is made of woven nylon fabric in deniers 500 to 1000. When unfolded and extended, the body sack 20, 20' 20" measures approximately 13 to 18 inches in diameter and 28 to 40 inches in length. The sidewall 22 may be partially made of nylon mesh with mesh openings ⅛ to ¼ inch in diameter.

The draw cord 22, the bag sack 40' and the elongated strap 70 may include reflective painted areas or fibers 29, 78, respectively that enable them to be seen at night. The draw cord 32 is made of nylon fiber approximately 3/16 inch in diameter. The elongated strap 70 is also made of nylon fiber and measures 1½ inches in width and 30 to 50 feet in length. The bag sack 40, 40' are made of solid and mesh panels that are sewn together along their adjoining edges.

During use, the body sack 20, 20', or 20" is stored in a folded configuration inside the small storage bag 40, 40', 40" respectively. In the preferred embodiment, the storage bag 40, 40', 40" measures approximately 13 to inches in length, 11 to 14 inches in height, and 5 to 8 inches in width. The storage bag 40, 40', and 40" may include two upper handles 40, 48, located on opposite sides of a top opening 44. A slide connector 46 is provided that enables the user to selectively open and close the top opening 44. As shown in FIG. 5, the bottom panel 42 of the storage bag 40 is integrally formed with one sidewall 22 of the storage bag 20 to form a single unit structure.

When the system 10 is needed, the body sack 20, 20' 20' is pulled from the storage bag 40, 40', 40", respectively, and unfolded into an extended, bag configuration designed to hold a small child 90 or animal. When the first bag sack 20 is used, one end of the rope 50 is securely tied to the handle 36. The child 90 or animal is then placed into the body sack 20, 20'. The top opening 26 of the body sack 20, 20' 20" is then adjusted so that the child or animal does not escape from the body sack 20, 20', and 20" as it is being descended over the side of a building 92 as shown in FIG. 1. The body sack 20 is then carried using the single handle 60 or the two handles 60, 60' and positioned over the window or deck. Grasping the rope 50 or elongated strap 70, the body sack 20, 20', 20", respectively, is then slowly descended. Once position at a safe location, the child 90 or animal is removed from the body sack 20, 20', 20" so that the body sack 20, 20', 20" may be pulled upward to safely remove other occupants from the room.

In compliance with the statute, the invention described herein has been described in language more or less specific as to structural features. It should be understood however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A portable personal descending escape system, comprising:
   a. a flexible, cylindrical-shaped body sack sufficient in width and length to hold and cover a small child or an animal placed inside said body sack, said body sack includes a top opening and sidewalls made of solid and mesh panels and a closed bottom, said mesh panels includes mesh openings that enable air to enter and escape from said body sack;
   b. a slide connector located around said top opening that enables said top opening to be selectively opened or closed;
   c. two handles attached to said sidewalls of said body sack near said top opening that enables said body sack to be held vertically and upright;
   d. an elongated strap longitudinally aligned and affixed to one said sidewall of said body sack and extending substantially perpendicular from said top opening, said elongated strap includes a plurality of strap handles only on one side of said strap, said strap handles longitudinally aligned and evenly spaced apart on said one side of said elongated strap enabling said elongated strap to be gradually released to lower said body sack containing a small child or animal from an elevated window or doorway; and,
   e. a portable storage bag for storing and transporting said body sack in a folded configuration.

2. The escape system as recited in claim 1, wherein said body sack measures approximately 30 inches in length and 13 inches in diameter.

3. The escape system, as recited in claim 1, wherein said body sack is made of nylon fabric 500 to 1000 denier.

4. The escape system as recited in claim 1, wherein said elongated strap measures between 30 to 50 feet in length.

5. The escape system as recited in claim 1, further including reflective paint or dyes on said body sack, on said draw cord or on said elongated strap.

6. A portable personal descending escape system, comprising:
 a. a flexible, cylindrical-shaped body sack configured for storage in a compact, folded configuration that when unfolded and expanded is sufficient in width and length to receive and cover a small child or an animal positioned longitudinally inside said body sack, said body sack includes a closed bottom panel, closed sidewalls made of material that enables air to enter and escape from said body sack, and a top opening opposite said bottom panel;
 b. a slide connector closing said top opening;
 c. at least one handle attached to said body sack near said top opening, said handle attached in a manner that enables said body sack to be vertically held upright and transported with a child or animal located inside said body sack to a window or doorway from which said body sack will be manually descended;
 d. an elongated strap with a plurality of strap handles only on one side of said strap, said strap handles longitudinally aligned and evenly spaced apart on said one side of said elongated strap, said elongated strap affixed at one end to said body sack so that said wide opening is continuously oriented in an upward position as said strap handles are selectively released to gradually descend said body sack containing a small child or animal from a window or doorway, said elongated strap wound into a flat roll when not use; and,
 e. a portable storage bag for storing said body sack in a compact folded configuration.

7. The escape system as recited in claim 6, further including reflective paint or dyes on said body sack, on said draw cord or on said elongated strap.

* * * * *